(12) United States Patent
Osborne

(10) Patent No.: US 9,027,654 B2
(45) Date of Patent: *May 12, 2015

(54) VALVE WITH SHUTTLE

(71) Applicant: Lawrence Osborne, Acton, CA (US)

(72) Inventor: Lawrence Osborne, Acton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,601

(22) Filed: Oct. 23, 2013

(65) Prior Publication Data

US 2014/0048250 A1 Feb. 20, 2014

Related U.S. Application Data

(60) Division of application No. 13/089,312, filed on Apr. 19, 2011, now Pat. No. 8,955,601, and a continuation-in-part of application No. 12/766,141, filed on Apr. 23, 2010, now Pat. No. 8,545,190.

(51) Int. Cl.
*E21B 34/08* (2006.01)
*E21B 43/12* (2006.01)
*F04B 47/00* (2006.01)
*F16K 17/26* (2006.01)

(52) U.S. Cl.
CPC .............. *E21B 34/08* (2013.01); *E21B 43/126* (2013.01); *F04B 47/00* (2013.01); *F16K 17/26* (2013.01)

(58) Field of Classification Search
USPC ............ 166/373, 319, 374, 334.3, 334.4, 68, 166/320, 321, 324, 369; 251/73, 333; 417/133.134; 137/876, 511.107, 517, 137/102
See application file for complete search history.

(56) References Cited

U.S. PATENT DOCUMENTS

| 3,027,907 A | 4/1962 | Lee |
| 4,057,074 A | 11/1977 | Fischer |
| 4,100,969 A | 7/1978 | Randermann |
| 4,248,264 A | 2/1981 | Hadsell et al. |
| 5,038,965 A * | 8/1991 | Cater .......................... 222/255 |
| 5,439,022 A | 8/1995 | Summers et al. |
| 2002/0174988 A1 | 11/2002 | Szarka |
| 2008/0041477 A1* | 2/2008 | Shotter et al. ................. 137/876 |

* cited by examiner

Primary Examiner — David Bagnell
Assistant Examiner — Ronald Runyan
(74) Attorney, Agent, or Firm — Paul D. Chancellor; Ocean Law

(57) ABSTRACT

A valve for use in a flow management system comprising a valve including a body, a shuttle, and a seat closure, a rotatable shaft passing through the body and the seat closure, the rotatable shaft for operating a mechanical pump, and, translation of the seat closure along the rotatable shaft operable to mate the seat closure with a seat of the shuttle.

4 Claims, 7 Drawing Sheets

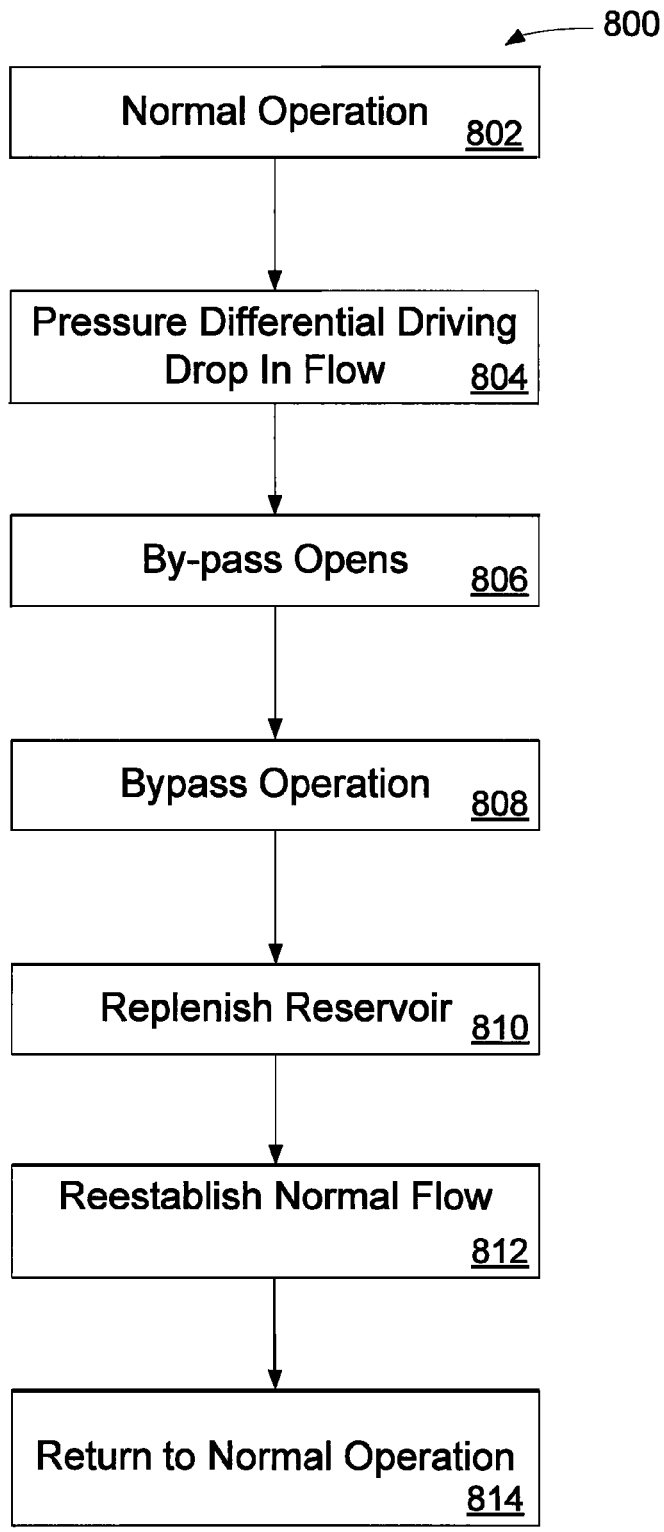

VALVE WITH SHUTTLE

PRIORITY CLAIM & INCORPORATION BY REFERENCE

This application is 1) a divisional of U.S. patent application Ser. No. 13/089,312 filed Apr. 19, 2011 and entitled VALVE WITH SHUTTLE which is 2) a continuation-in-part of U.S. patent application Ser. No. 12/766,141 filed Apr. 23, 2010 and entitled VALVE WITH SHUTTLE FOR USE IN A FLOW MANAGEMENT SYSTEM, now U.S. Pat. No. 8,545,190. These U.S. patent application Ser. Nos. 13/089,312 and 12/766,141 are incorporated herein, in their entireties and for all purposes.

BACKGROUND OF THE INVENTION

1. Field of the Invention

The present invention relates to a system for managing a fluid flow. In particular, the system includes a valve with a shuttle for managing a fluid flow.

2. Discussion of the Related Art

Pumps and valves located in hard to reach places present maintenance and maintenance downtime issues. Where pumps and valves are used to produce a natural resource such as a hydrocarbon, downtime can result in lost production and increased expenses for workmen and materials.

In particular, downhole production strings including pumps and valves for lifting fluids such as particulate laden liquids and slurries present a maintenance problem. Here, both pumps and valves can lose capacity and in cases be rendered inoperative when conditions including fluid conditions and fluid velocities fall outside an intended operating range. Such unintended operating conditions can foul, plug, and damage equipment.

Despite the industry's resistance to change, there remains a need to improve production strings.

SUMMARY OF THE INVENTION

The present invention includes a valve with a shuttle and is intended for use in a flow management system.

In an embodiment, a valve body includes a spill port and a shuttle is located in a chamber of the valve body. The shuttle has a through hole extending between a shuttle closure end and a shuttle spring end. A first seat and a first seat closure are located in the through hole. Second and third seats are located in the valve body chamber and second and third seat closures are located on the shuttle closure end. A spring is located substantially between the shuttle spring end and a fixture coupled to the valve body. The valve is operable to pass a flow entering the through hole at the shuttle spring end and to spill a flow that closes the first seat closure. In some embodiments, the circumference of the second seat is greater than the circumference of the third seat and the circumference of the shuttle spring end is more than two times greater than the circumference of the third seat.

In an embodiment, a valve body includes a spill port and a shuttle located in a chamber of the valve body. The shuttle has a through hole extending between a shuttle closure end and a shuttle spring end. A valve center line is shared by the valve body and the shuttle. A first seat is located on a first face of the shuttle and there is a first seat closure. The first seat closure has a central bore for accepting a rotatable shaft extending through the valve body and the first seat closure is for translating along the rotatable shaft. A second seat is located in the valve body chamber and a second seat closure is located on a second face of the shuttle. A spring is located substantially between the shuttle spring end and a valve body support. The valve is operable to pass a flow entering the through hole at the shuttle spring end and to spill a flow that closes the first seat closure.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

FIG. 8 is a flow chart showing a mode of operation of the valve of FIG. 7.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

To the extent parts, components and functions of the described invention exchange fluids, the associated interconnections and couplings may be direct or indirect unless explicitly described as being limited to one or the other. Notably, indirectly connected parts, components and functions may have interposed devices and/or functions known to persons of ordinary skill in the art.

Figures 1, 2:
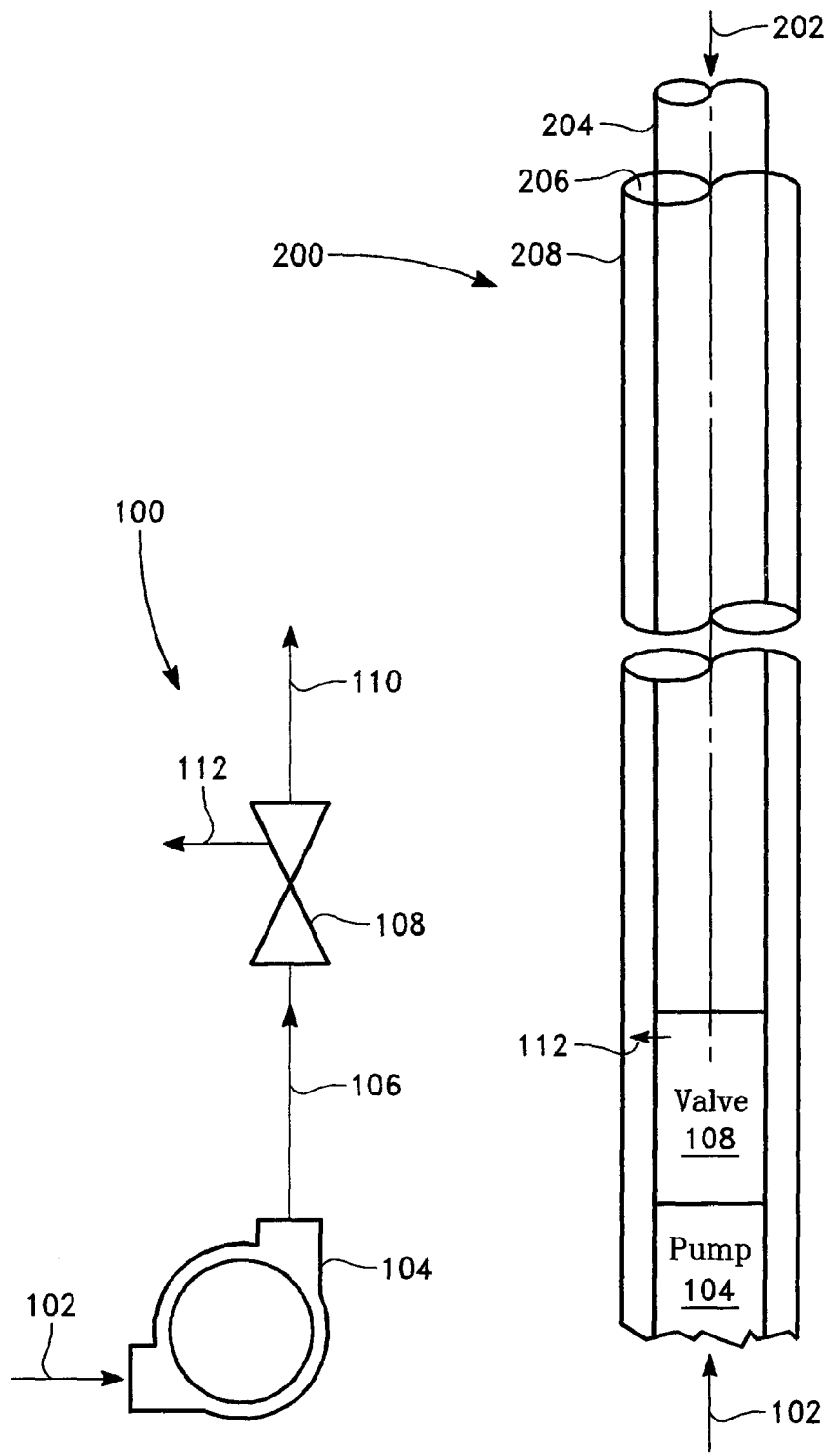
FIG. 1 is a schematic diagram of a valve in a flow management system in accordance with the present invention.
FIG. 2 is a diagram of the flow management system of FIG. 1.

FIG. 1 shows an embodiment of the invention 100 in the form of a schematic diagram. A bypass valve 108 is interconnected with a pump 104 via a pump outlet 106. The pump includes a pump inlet 102 and the valve includes a valve outlet 110 and a valve spill port 112. In various embodiments, the inlets, outlets and ports are one or more of a fitting, flange, pipe, or similar fluid conveyance.

FIG. 2 shows a section of a typical downhole production string 200. The production string includes the bypass valve 108 interposed between the pump 104 and an upper tubing string 204. In some embodiments, a casing 208 surrounds one or more of the tubing string, valve, and pump. Here, an annulus 206 is formed between the tubing string and the casing. A production flow is indicated by an arrow 102 while a backflow is indicated by an arrow 202. In various embodiments, the bypass valve serves to isolate backflows from one or more of the valve, portions of the valve, and the pump.

Figure 3:
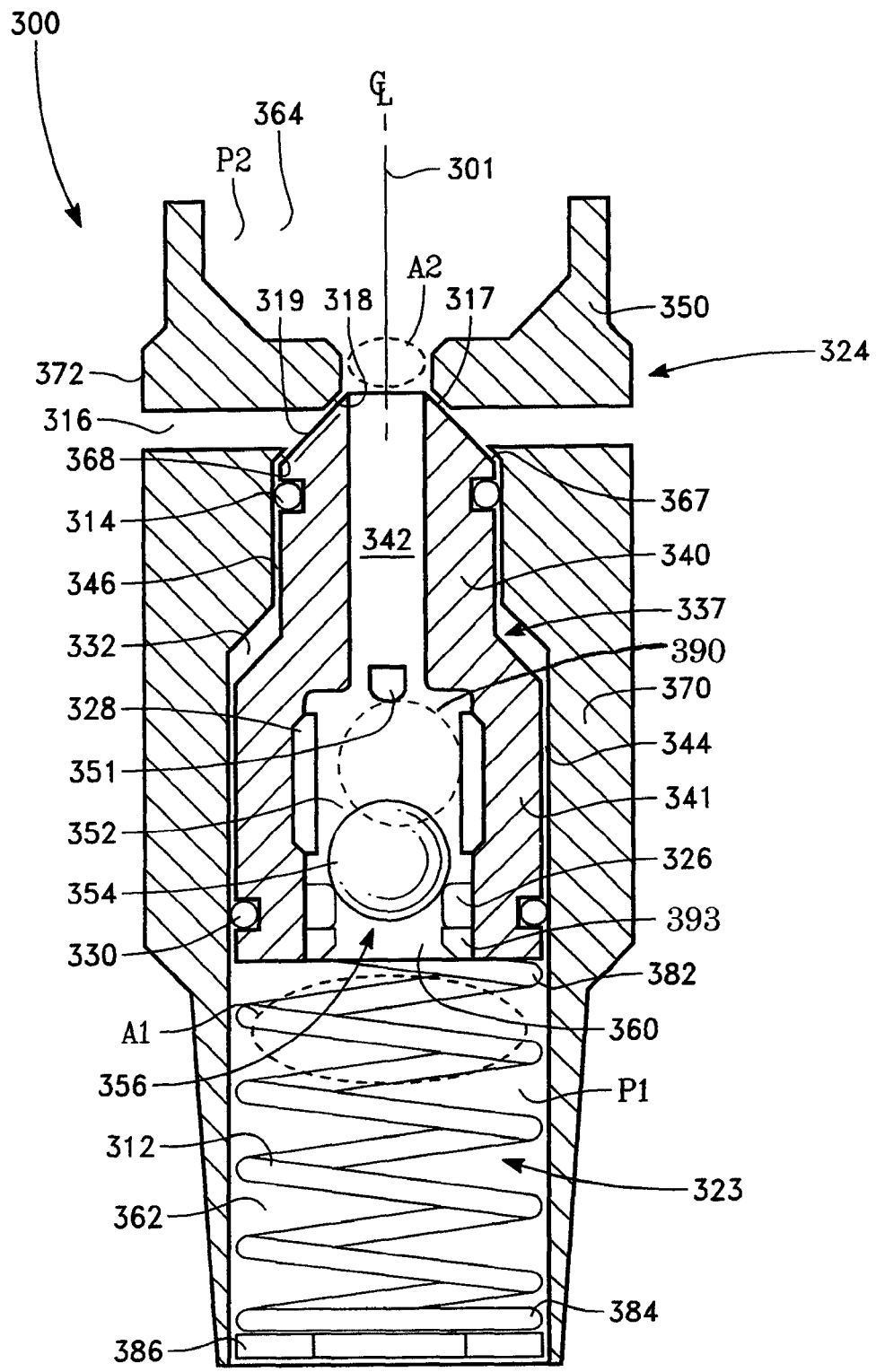
FIG. 3 is a cross-sectional view of a valve of the flow management system of FIG. 1.

FIG. 3 shows a first bypass valve 300. A valve body 324 houses components including a valve shuttle 337 and a charge spring 312. The valve body has a central chamber 323.

The shuttle 337 includes an upper section 340 adjacent to a lower section 341. In an embodiment, the central chamber includes a first bore 344 for receiving the lower shuttle section and a second bore 346 for receiving the upper shuttle section. In embodiments where the first and second bore diameters are different, a grease space 332 may be provided between the shuttle 337 and the valve body section 370 (as shown). In other embodiments, the first and second bore diameters are substantially the same and there is no grease space.

Upper and lower seals 314, 330 are fitted circumferentially to the upper shuttle section and the lower shuttle section 340, 341. In an embodiment, the seals have a curved cross-section such as a circular cross-section (as shown). In another embodiment the seals have a rectangular cross-section.

Figure 5:
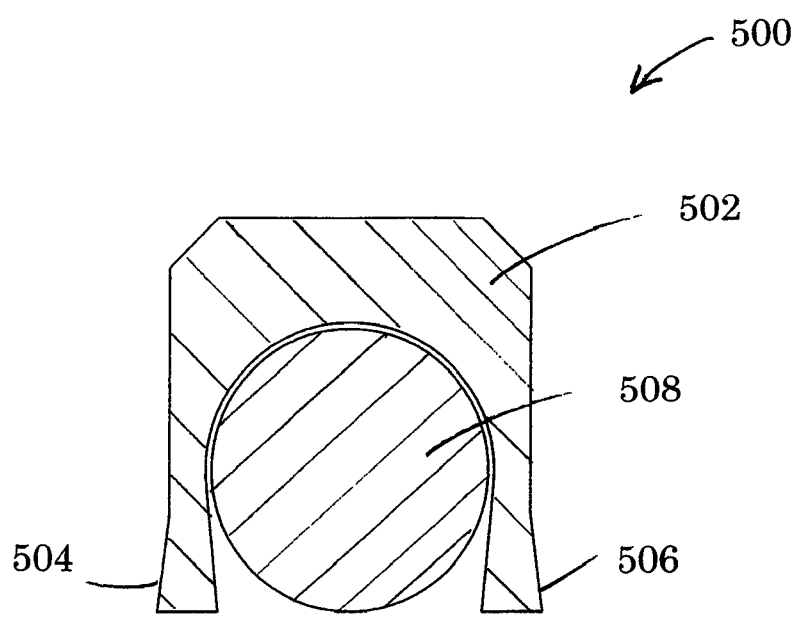
FIG. 5 is a cross-sectional view of a seal of the flow management system of FIG. 1.

In some embodiments, one or more seals 314, 330 have a structure 500 similar to that shown in FIG. 5. Here, a seal body 502 such as a polymeric body has inner and outer lip seals 506, 504 and substantially envelops a charge O-ring 508 such as a silicon rubber ring.

In various embodiments, the seals 314, 330 are made from one or more of a rubber, plastic, metal, or another suitable material known to persons of ordinary skill in the art. For example, seal materials include silicone rubber, elastomers, thermoplastic elastomers, and metals that are soft in comparison to the valve body 324, the selection depending, inter alia, on the valve application. In an embodiment, the seals are made from ultra-high-molecular-weight polyethylene.

The shuttle has a through-hole 356 including an upper through-hole section 342 and a lower through-hole section 352. Upper and lower through-hole ports 362, 360 bound a flow path through the shuttle indicated by the through-hole. In an embodiment, the upper through-hole cross-section is smaller than the lower through-hole cross-section.

Located near the lower through-hole section are a first seat closure 354, a first seat 326, and a seat retainer 393. In an embodiment, the first seat is about radially oriented with respect to the valve body centerline 301.

In an embodiment, the first seat closure 354 is a plug. In various embodiments, the first seat closure is spherically shaped, conically shaped, elliptically shaped, or shaped in another manner known to persons of ordinary skill in the art. And, in an embodiment, the first seat closure is substantially spherically shaped. The closure is movable with respect to the shuttle 337 within a cage 328. When resting against the first seat 326, the first closure seals the lower through-hole port 360. In an embodiment, a stabilizer near an upper end of the cage 351 prevents the closure from blocking the passage comprising the upper and lower through-hole sections 342, 352 when the closure is near the upper end of the cage 390.

Located near an upper valve body section 350 is a second seat 318. In an embodiment, the second seat is about radially oriented with respect to the valve body centerline 301.

A second seat closure 317 is located at an upper end of the shuttle 337. In an embodiment, the second seat closure is located on a peripheral, sloped face of the shuttle 319. In various embodiments, the second seat closure is spherically shaped, conically shaped, elliptically shaped, or shaped in another suitable manner known to persons of ordinary skill in the art. And, in an embodiment, the second seat closure is substantially frustoconically shaped. The closure is movable with the shuttle along a line substantially parallel to a centerline of the valve body 301.

Located near the upper valve body section 350 is a third seat 368. In an embodiment, the third seat is about radially oriented with respect to the valve body centerline 301. About radially arranged and located between the second and third seats 318, 368, are one or more spill ports 316 extending between a valve body exterior 372 and the valve body central chamber 323.

A third seat closure 367 is located at a shuttle 337 upper end. In an embodiment, the third seat closure is located on a peripheral, sloped face of the shuttle 319. In various embodiments, the third seat closure is spherically shaped, conically shaped, elliptically shaped, or shaped in another manner known to persons of ordinary skill in the art. And, in an embodiment, the second seat closure is substantially frustoconically shaped. The closure is moveable with the shuttle along a line substantially parallel to a centerline of the valve body 301.

The second and third seat closures 317, 367 are formed to substantially simultaneously close the second and third seats 318, 368. When resting against the second and third seats 318, 368, the second closure establishes a flow path between a variable volume valve chamber below the shuttle 362 and an upper valve chamber above the second seat 364 while the third closure blocks flow in the spill port 316. When moved away from the second seat, the second closure unblocks flow in the spill port.

Tending to bias the shuttle 337 upward is the charge spring 312. In various embodiments, the charge spring is about radially oriented with respect to the valve body centerline 301 and is seated 384 on an annular fixture supported by the valve body 386. In various embodiments, an upper end of the spring 382 presses against the shuttle.

In normal operation, forces on the shuttle determine the position of the shuttle.

An equilibrium position of the shuttle 337 in the valve body 324 is determined by the forces acting on the shuttle.

For example, when the pump 104 is lifting fluid through the valve 300, the spring constant k of the charge spring 312, the area A1, and the area A2 are selected to cause a net upward force on the shuttle tending to move the shuttle to its uppermost position, sealing the spill ports 316. At the same time, the rising fluid lifts the first closure away from its seat. These actions establish a flow path through the shuttle. In an embodiment, A1 is greater than A2. And, in an embodiment, A1 is about three times larger than A2.

When fluid lifting stops or falls below a threshold value, the net force on the shuttle tends to move the shuttle away from its uppermost position. At the same time, insufficient rising fluid causes the first closure 354 to come to rest against the first seat 326. These actions unblock the spill ports 316 and establish a fluid flow path from the upper chamber 364 to the spill port(s) 316 while blocking the flow path through the shuttle. In some embodiments, the threshold value is a flow rate specified by the pump manufacturer as being a recommended or safe pump flow rate.

From the above, it can be seen insufficient fluid flow, no fluid flow, or reverse fluid flow cause the valve 300 and pump 104 to be substantially removed from the fluid circuit and/or isolated from the fluid column above the shuttle 337. A benefit of this isolation is protection of the valve and pump. One protection afforded is protection from solids (such as sand), normally rising with the fluid but now moving toward the valve and pump, that might otherwise foul or block one or both of these components. Blocking the shuttle flow path and opening the spill ports 316 removes these solids outside the tubing string 204.

In various embodiments the valve 300 is made from metals or alloys of metals including one or more of steel, iron, brass, aluminum, stainless steel, and suitable valve seat and closure materials known to persons of ordinary skill in the art. And, in various embodiments, one or more parts of the valve are made from non-metals. For example, valve closures and seats may be made from one or more suitable polymers such as PTFE (Polytetrafluoroethylene), POM (Polyoxymethylene) and PEEK (Polyetheretherketone). In an embodiment, the closure 354 is made from materials including PEEK.

Figure 4:
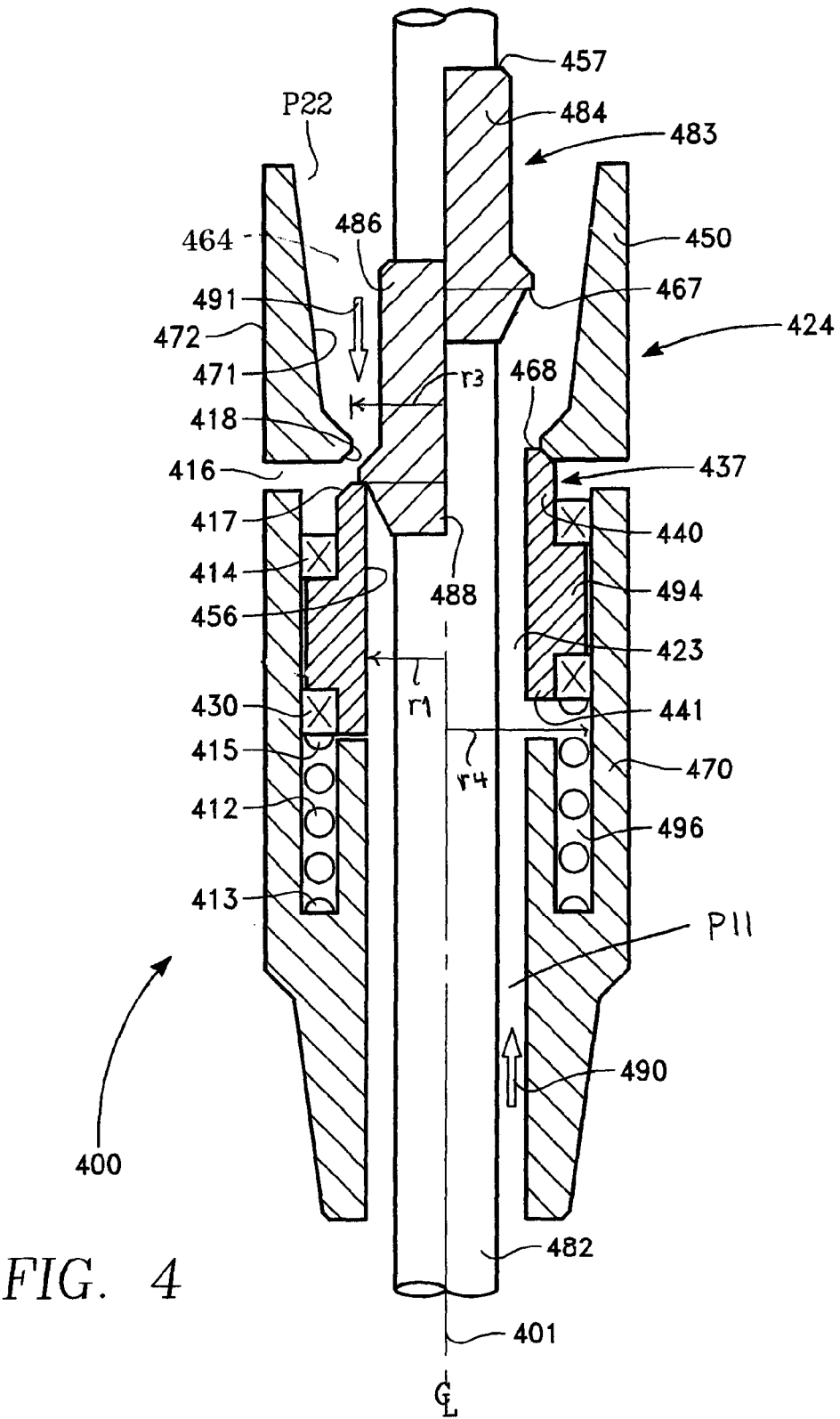
FIG. 4 is a cross-sectional view of a second valve of the flow management system of FIG. 1.

FIG. 4 shows a second bypass valve 400. A valve body 424 houses components including a valve shuttle 437, a valve closure 483, and a charge spring 412. The valve body has a central chamber 423 and a rotatable shaft 482 passes through the central chamber. The shuttle includes an upper section 440 adjacent to a lower section 441.

Upper and lower seals 414, 430 are fitted circumferentially to the upper shuttle section and the lower shuttle section 440, 441. In one embodiment, the seals have a curved cross-section such as a circular cross-section. In another embodiment, the seals have a rectangular cross-section (as shown).

In some embodiments, one or more seals 414, 430 have a structure 500 similar to that shown in FIG. 5. Here, a seal body 502 such as a polymeric body has inner and outer lip seals 506, 504 and substantially envelops a charge O-ring 508 such as a silicon rubber ring.

And, in various embodiments, the seals 414, 430 are made from one or more of a rubber, plastic, metal, or another suitable material known to persons of ordinary skill in the art. For example, seal materials include silicone rubber, elastomers, thermoplastic elastomers, and metals that are soft in comparison to the valve body 424, the selection depending, inter alia, on the valve application. In an embodiment, the seals are made from ultra-high-molecular-weight polyethylene.

The shuttle and valve closure 437, 483 have through-holes 456, 457 and the rotatable shaft 482 passes through these through-holes. In various embodiments, no "in/out" tools are required to insert the rotatable shaft through the shuttle and valve closure as their hole dimensions pass shafts with diameters as large as the drift of the tubing through which they pass. A first face of the shuttle in the form of a first seat 468 is for sealing against a face of the valve closure 467. In an embodiment, the first seat is near an upper end of the shuttle 440 and the valve closure sealing face is near a lower end of the valve closure 488. In some embodiments, the first valve seat is about radially oriented with respect to the valve body centerline 401. In various embodiments, the shuttle sealing face is integral with or coupled to the shuttle. And, in various embodiments, the valve closure sealing face is integral with or coupled to the valve closure.

A second face of the shuttle 417 is for sealing against a face of the valve body in the form of a second seat 418. In an embodiment, the second seat is near an upper section of the valve body 450 and the second face of the shuttle is near an upper end of the shuttle 440. In some embodiments, the second valve seat is about radially oriented with respect to the valve body centerline 401. In various embodiments, the shuttle sealing face is integral with or coupled to the shuttle. And, in various embodiments, the second seat is integral with or coupled to the valve body 424.

About radially arranged and located between upper and mid valve body sections 450, 470 are one or more spill ports 416. Each spill port extends between inner and outer walls of the valve body 471, 472.

Tending to bias the shuttle 437 upward is the charge spring 412. In various embodiments, the charge spring is about radially oriented with respect to the valve body centerline 401 and is seated 413 in a slot 496 formed in a valve body center section 470. In an embodiment, an upper end of the spring 415 presses against the shuttle.

During normal operation of a flow management system using the second bypass valve 400, the shaft 482 rotates and operates the pump 104. Forces on the shuttle 437 and valve closure 483 determine their position. When the pump 104 is lifting fluid within the tubing and within a designed flow-rate range 490, the shuttle is in its uppermost position 494 under the influence of the charging spring 412 and the rising fluid lifts the valve closure free of the shuttle 484. Notably, in its uppermost position, the shuttle blocks the spill ports 416 when shuttle sealing face 417 seals with the first seat 418. In some embodiments designed flow-rate ranges are the flow-rates specified by the pump manufacturer as recommended and/or safe pump operating ranges.

When the pump 104 ceases to lift fluid at a sufficient rate, as with back-flow 491, the valve closure contacts the shuttle 486 and the valve closure sealing face 467 seals with the second seat 468. Further, if pressure P11,P22 induced forces cause the shuttle to compress the spring 412, the shuttle moves downward and the spill port(s) 416 is unblocked allowing fluid in the tubing above the valve to spill outside the valve 400, for example into the annular space between the tubing and the casing 206. In various embodiments, pressure P11 acts on an annular area defined by radii r1 and r4 while pressure P22 acts on an annular area defined by r1 and r3. Here, the annular areas are different such as in a ratio range of about 1.5-2.5 to 1 and in an embodiment in a ratio of about 2.0 to 1. In various embodiments, the spill port(s) is unblocked when the shuttle forces resulting from the pressure above the first seat P22 and the shuttle mass overcome the force of the charging spring 412 and the force resulting from the pressure below the valve closure P11.

When the pump 104 ceases to lift fluid at a sufficient rate, as with back-flow 491, the valve closure contacts the shuttle 486 and the valve closure sealing face 467 seals with the second seat 468. Further, if pressure P11,P22 induced forces cause the shuttle to compress the spring 412, the shuttle moves downward and the spill port(s) 416 is unblocked allowing fluid in the tubing above the valve to spill outside the valve 400, for example into the annular space between the tubing and the casing 206. In various embodiments, pressure P11 acts on an annular area defined by radii r1 and r4 while pressure P22 acts on an annular area defined by r1 and r3. Here, the annular areas are different such as in a ratio range of about 1.5-2.5 to 1 and in an embodiment in a ratio of about 2.0 to 1. In various embodiments, the spill port(s) is unblocked when the shuttle forces resulting from the pressure above the first seat P22 and the shuttle mass overcome the force of the charging spring 412 and the force resulting from the pressure below the valve closure P11.

From the above, it can be seen insufficient fluid flow, no fluid flow, or reverse fluid flow cause the valve 400 and pump 104 to be removed from the fluid circuit and/or isolated from a fluid column above the shuttle. A benefit of this isolation is protection of the valve and pump. One protection afforded is protection from solids (such as sand), normally rising with the fluid but now moving toward the valve and pump, that might otherwise foul or block one or both of these components. Blocking the flow path around the shuttle and opening the spill port(s) 416 removes these solids outside the tubing string 204.

In various embodiments the valve 400 is made from metals or alloys of metals including one or more of steel, iron, brass, aluminum, stainless steel, and suitable valve seat and closure materials known to persons of ordinary skill in the art. And, in various embodiments, one or more parts of the valve are made from non-metals. For example, valve closures and seats may be made from one or more suitable polymers such as PTFE (Polytetrafluoroethylene), POM (Polyoxymethylene) and PEEK (Polyetheretherketone). In an embodiment, the closure 483 is made from materials including PEEK.

In various embodiments incorporating one or more of the features described above, the bypass valves of FIGS. 3 and 4 provide fouling/plugging protection to valves and fouling/plugging/burn-out protection to pumps due to contaminants such as sand. For example, below design production flow rates causing abnormal valve/pump operation or damage in traditional production string equipment is avoided in many cases using embodiments of the bypass valves of the present invention.

Notably, embodiments of the bypass valves of FIGS. 3 and 4 can replace or supplement protection systems now associated with some production strings. One such protection system is the "pump-off controller" ("POC") used to protect pumps from failures due to abnormal operations such as reduced flow conditions and loss of flow conditions.

Figure 6:
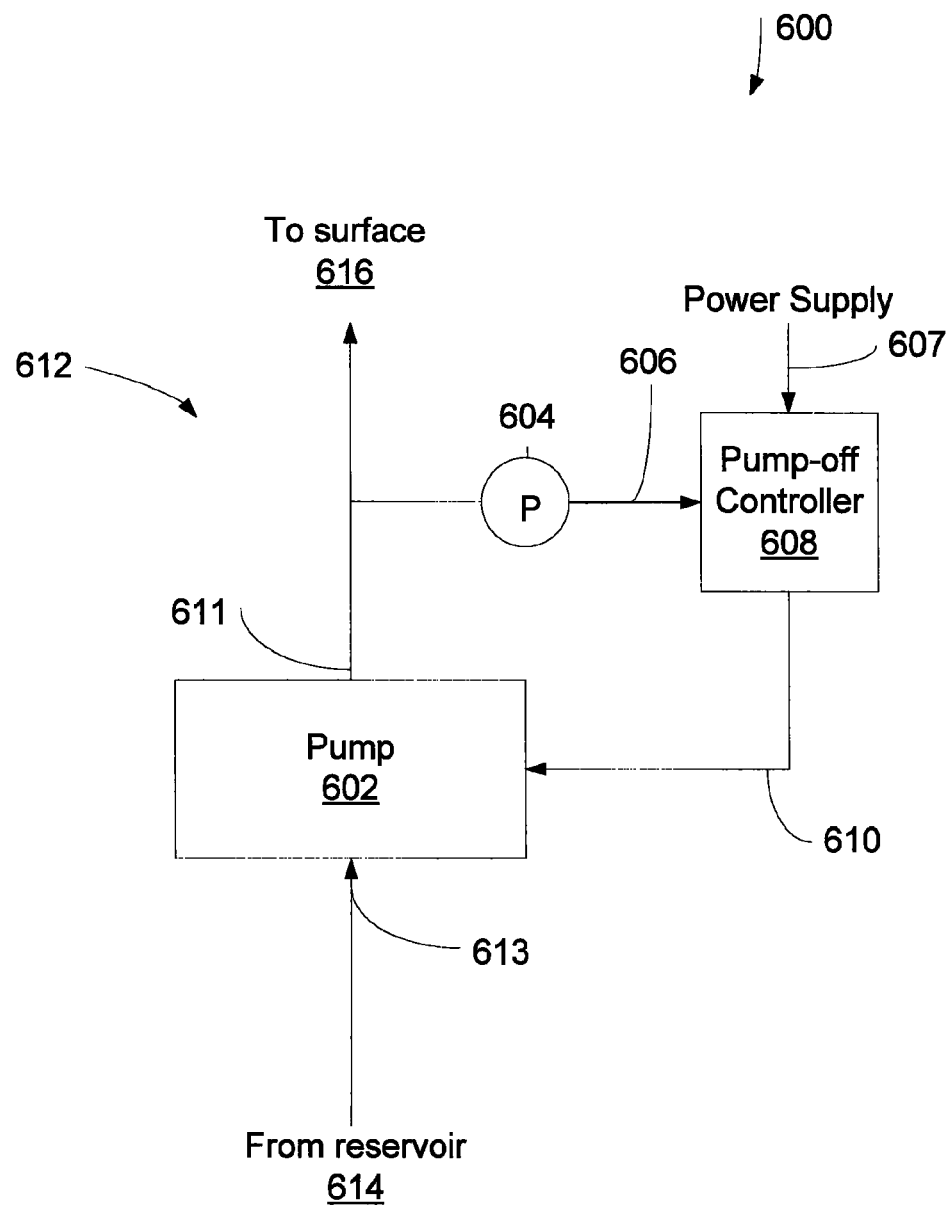
FIG. 6 is a schematic diagram of a pump-off controller implemented in a traditional production string 600.

FIG. 6 shows an illustrative example of a pump off controller installation in a production string 600. The portion of the production string 612 illustrated includes a pump 602 lifting product from a reservoir 614 to the surface 616. A pump-off controller 608 receives power from a power source 607 and provides power to the pump 610 in accordance with a control algorithm. For example, a pressure indicating device 604 monitors a pressure near the pump discharge 611 and provides a signal indicative of pressure 606 to the pump-off controller. If the pump-off controller determines the indicated pressure is below a preselected low-pressure set point, the POC stops supplying power to the pump. Conditions causing low pump discharge pressure include insufficient product at the pump inlet 613 (i.e. a "dry suction"), pump fouling, and pump damage. Attempting to run the pump under any of these conditions has the potential to damage or further damage the pump.

Figure 7:
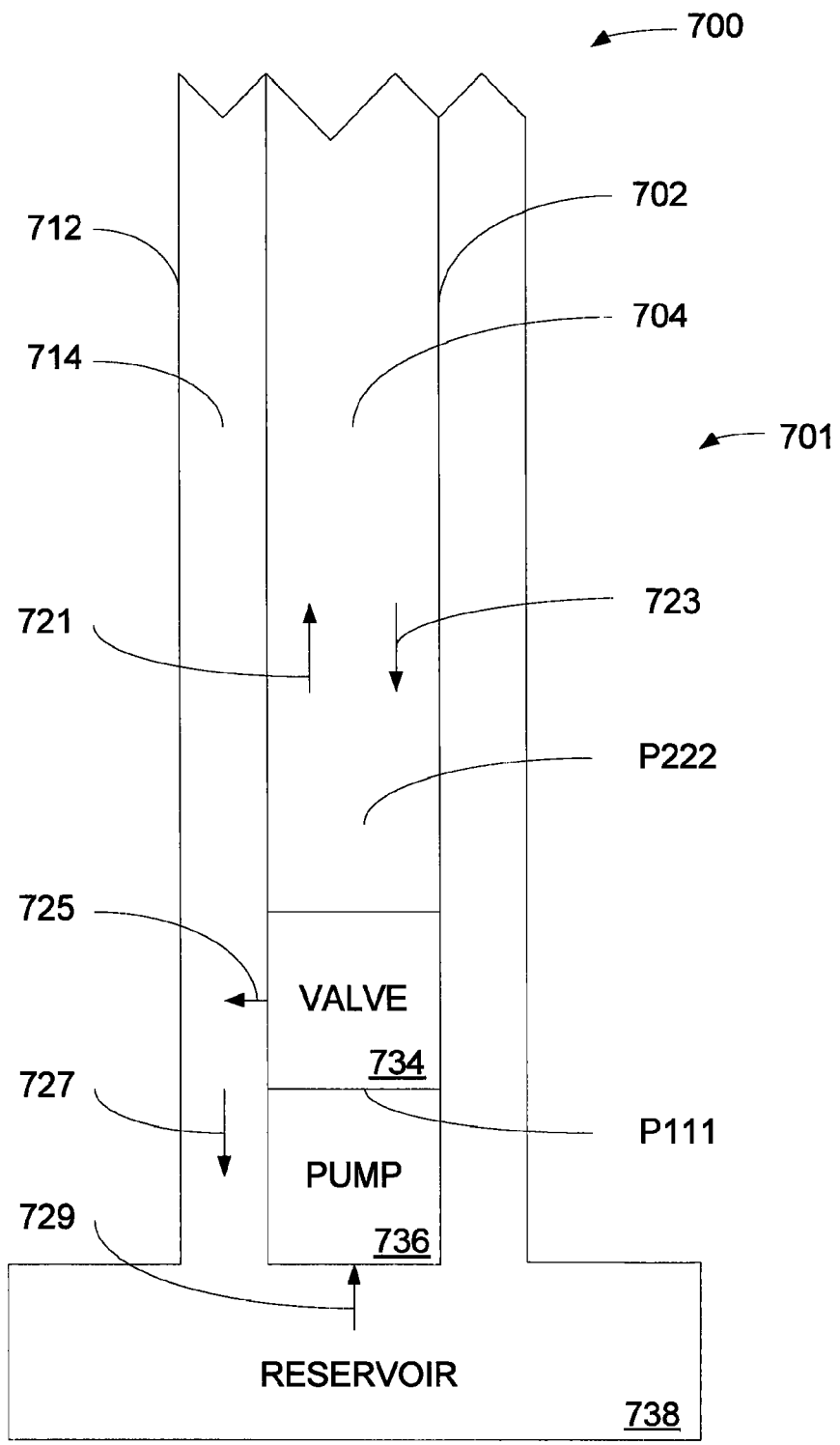
FIG. 7 is a schematic diagram of a valve of FIG. 1 used to implement a pump-off controller.

FIG. 7 shows a pump-off controller embodiment of the present invention 700. A production string 701 includes a flow management system with a pump 736 interposed between a reservoir 738 and a valve 734. Product the pump lifts from the reservoir 729 passes first through the pump and then through a bypass valve 734. The bypass valve discharges 721 into a tubing space 704 of a tubing string 702 that is surrounded by a casing 712 creating an annulus 714 between the outer casing and the inner tubing.

FIG. 8 shows a mode of bypass valve operation that substitutes for or augments a production string pump-off controller 800. For example, after a period of normal operation 802, the pressure differential (P111>P222) driving the flow in a production string 721 begins to fall 804. As explained above, low flow conditions cause the closure 354, 483 to mate with the shuttle 337, 437 which blocks flow through the valve along its centerline 301, 401. When the forces on the shuttle 337, 437 are no longer sufficient to maintain the shuttle in a position to block the spill port 316, 416, the shuttle moves to unblock the spill port/open the bypass 806. During bypass operation 808, flow through the valve is blocked and the spill port(s) is open, product flows from the upper tubing string 723, enters the upper valve chamber 364, 464, and leaves the valve through its spill port(s) 725. The spill port empties into a space such as an annulus between the tubing and the casing 614.

Because the annulus 614 is fluidly coupled to the reservoir 738 (e.g. as shown in FIG. 7), valve bypass from the spill ports is returned to the reservoir 727 in the replenishment step 810.

In various embodiments, filling the reservoir with the fluid from the valve bypass serves to flood the suction of the pump, lift the closure 354, 483, and unblock the flow through the valve along its centerline 301, 401 where normal flow is re-established in step 812. Re-establishment of normal flow is followed by a return to normal operation in step 814.

The pump-off control steps of FIG. 8 result, in various embodiments, in cyclic flows through the pump. The time between these cyclic flows is shorter than would occur with a traditional valve in a traditional production string configuration because such strings are unable to bypass flow to the reservoir.

As persons of ordinary skill in the art will appreciate, many production string pumps rely on the pumped product as pump lubrication and coolant. Therefore, reducing the duration of dry pumping periods reduces pump damage due to operation with insufficient lubricant and coolant. The benefits include one or more of longer pump life, fewer outages, and higher production from tight reservoirs.

The present invention has been disclosed in the form of exemplary embodiments; however, it should not be limited to these embodiments. Rather, the present invention should be limited only by the claims which follow where the terms of the claims are given the meaning a person of ordinary skill in the art would find them to have.

What is claimed is:

1. A valve for use in a flow management system comprising:
    a valve including a body, a shuttle, and a seat closure;
    a rotatable shaft passing through the body and the seat closure, the rotatable shaft for operating a mechanical pump;
    translation of the seat closure along the rotatable shaft operable to mate the seat closure with a seat of the shuttle; and,
    during an operating mode, a valve exiting flow path established perpendicular to a shaft longitudinal axis after a spring between the shuttle and a valve body end is compressed.

2. A valve for use in a flow management system comprising:
    a valve including a body, a shuttle, and a seat closure;
    a rotatable shaft passing through the body and the seat closure, the rotatable shaft for operating a mechanical pump;
    translation of the seat closure along the rotatable shaft operable to mate the seat closure with a seat of the shuttle; and,
    during an operating mode, a valve exiting flow path established parallel to a shaft longitudinal axis after a spring between the shuttle and a valve body end is decompressed.

3. A valve for use in a flow management system comprising:
    a valve including a body, a shuttle, and a seat closure;
    the body and seat closure configured to receive a rotatable shaft passing therethrough, the rotatable shaft for operating a mechanical pump;
    the seat closure configured for translating along a rotatable shaft;
    the seat closure operable to mate with a seat of the shuttle;
    a cyclic operating mode that establishes a valve first exiting flow path parallel to a longitudinal axis of the valve and a valve second exiting flow path perpendicular to the longitudinal axis of the valve;

the valve configured to utilize the first exiting flow path when a first flow at a first flowrate separates the seat closure and a shuttle seat;

the valve configured to utilize the second exiting flow path when a second flow at a second flowrate fails to separate the seat closure and the shuttle seat;

a liquid reservoir in fluid communication with a pump suction, the reservoir configured to receive the second flow;

the pump configured to remove fluid collected in the reservoir via the first exiting flow path; and, a spring for biasing the position of the shuttle with respect to the valve body.

4. A valve for use in a flow management system comprising:

a valve including a body, a shuttle, and a seat closure;

the body and seat closure configured to receive a rotatable shaft passing therethrough, the rotatable shaft for operating a mechanical pump;

the seat closure configured for translating along a rotatable shaft;

the seat closure operable to mate with a seat of the shuttle;

a cyclic operating mode that establishes a valve first exiting flow path parallel to a longitudinal axis of the valve and a valve second exiting flow path perpendicular to the longitudinal axis of the valve;

the valve configured to utilize the first exiting flow path when a first flow at a first flowrate separates the seat closure and a shuttle seat;

the valve configured to utilize the second exiting flow path when a second flow at a second flowrate fails to separate the seat closure and the shuttle seat;

a liquid reservoir in fluid communication with a pump suction, the reservoir configured to receive the second flow;

the pump configured to remove fluid collected in the reservoir via the first exiting flow path;

a spring for biasing the position of the shuttle with respect to the valve body; and, a central flow path extending through the shuttle.

* * * * *